United States Patent [19]

Dobbs

[11] Patent Number: 4,831,897

[45] Date of Patent: May 23, 1989

[54] TORSIONALLY COMPLIANT GEAR FOR USE IN MULTIPLE LOAD PATH TRANSMISSIONS

[75] Inventor: Daniel R. Dobbs, Sunnyvale, Calif.

[73] Assignee: Sundstrand Corporation, Rockford, Ill.

[21] Appl. No.: 104,810

[22] Filed: Oct. 5, 1987

[51] Int. Cl.$^4$ .................. F16H 55/14; F16D 3/76
[52] U.S. Cl. .......................... 74/411; 74/414; 74/421 R; 74/443; 464/90; 464/160
[58] Field of Search ............ 74/411, 443, 414, 421 R, 74/421 A; 464/89, 90, 160

[56] References Cited

U.S. PATENT DOCUMENTS

| | | | |
|---|---|---|---|
| 1,043,012 | 10/1912 | Hudson | 74/443 |
| 1,854,941 | 4/1932 | Kiel | 74/411 |
| 2,407,114 | 9/1946 | Tyler et al. | 74/411 |
| 2,727,368 | 12/1955 | Morton | 464/89 |
| 2,869,388 | 1/1959 | Kreis | 74/443 |
| 3,195,324 | 7/1965 | Sellwood et al. | 74/411 X |
| 3,371,549 | 3/1968 | Schrempp | 74/411 |
| 3,406,583 | 10/1968 | Baier | 74/411 |
| 3,499,343 | 3/1970 | Burkhardt et al. | 464/90 X |
| 3,633,441 | 1/1972 | Wicks et al. | 74/411 X |
| 4,189,951 | 2/1980 | Sauter | 74/440 |
| 4,674,351 | 6/1987 | Byrd | 464/90 X |

*Primary Examiner*—Allan D. Herrmann
*Attorney, Agent, or Firm*—Wood, Dalton, Phillips Mason & Rowe

[57] ABSTRACT

Unequal loading in multiple load path transmissions having independent gear trains 18, 20, interconnecting an input and an output shaft 12 and 14, respectively, is avoided through the use of a torsionally compliant gear 22 located in each gear train 18 and 20. Each torsionally compliant gear 22 includes a hub 40 and a ring 46 having external gear teeth 48 about the hub 40 in concentric spaced relation. A body 50 of elastomeric material is disposed between the hub 40 and the ring 46 and spring fingers 68 carried by the ring 46 at least somewhat radially extend toward the hub 40. Stops 84 are carried by the hub 40 and are positioned to be normally spaced from the spring fingers 68 when low loads are transmitted by the gear and to engage the spring fingers 68 when predetermined higher loads are to be transmitted by the gear.

8 Claims, 1 Drawing Sheet

TORSIONALLY COMPLIANT GEAR FOR USE IN MULTIPLE LOAD PATH TRANSMISSIONS

FIELD OF THE INVENTION

This invention relates to multiple load path transmissions employing gear trains, and more particularly, to a torsionally compliant gear that may be utilized in such gear trains.

BACKGROUND OF THE INVENTION

Multiple load path transmissions are frequently employed where spacial and weight constraints are of considerable concern. In the usual case, several nominally identical gear trains are placed in parallel so as to be independent of one another and carry the same load as one single gear train utilizing components that are of lesser size and of lesser weight. Through careful organization of the gear trains, the overall size of the transmission can be reduced over that utilizing a single load path as well.

Systems of this type may be advantageously employed for example, in aircraft. One problem is almost universally attendant the use of multiple load path transmissions. Manufacturing errors or tolerances will frequently result in one of the paths in the transmission carrying a greater load than another leg or legs. If this situation is permitted to occur, each leg must be designed to carry somewhat more load than is necessary in order to compensate for the possibility of manufacturing errors. This, of course, means a loss of the advantages attendant multiple load path transmissions. Further, noise generation will increase because of the mismatch in load paths.

To avoid these difficulties, attempts have been made to provide some means in the paths of the multiple load path transmission to compensate for manufacturing errors. Not infrequently, a torsion shaft will be utilized and one end may twist relative to the other until load equalization throughout the transmission is obtained.

This solution, while mechanically satisfactory, increases the length of the transmission because of the need for a relatively long torsion shaft.

The assignee of the present application has proposed to eliminate this difficulty by utilizing, in each leg of a multiple load path transmission, a torsionally compliant gear wherein a gear tooth ring is carried by a hub and is connected thereto by a bonded layer of elastomer. This not only compensates for unequal loading by allowing adjustment within the system to achieve equal loading, it provides a measure of noise isolation of various parts of the transmission from others. Because the sole connection between the ring and the hub is by means of elastomeric material, for a given sized gear, high level loading cannot be achieved as easily as desired.

The present invention is directed to overcoming one or more of the above problems.

SUMMARY OF THE INVENTION

It is the principal object of the invention to provide a new and improved gear of the torsionally compliant type. More specifically, it is an object of the invention to provide a torsionally compliant gear that may be advantageously utilized in multiple load path transmissions and which is capable of operating without failure under extremely high loads.

An exemplary embodiment of the invention achieves the foregoing object in a gear including a hub. A ring having gear teeth is concentric with the hub and in spaced relation thereto. A body of elastomeric material is disposed between the hub and the ring and interconnects the two. Springs are carried by one of the ring and the hub. Stop means are disposed on the other of the ring and the hub and are positioned to be normally spaced from the springs when low loads are transmitted by the gear and to engage the springs when predetermined higher loads to be transmitted by the gear exist.

As a result of such a construction, noiseless, low load transmission is present making the gear ideally suited for use in multiple load path transmissions employed, for example, in naval torpedoes, and for propelling such a torpedo at a relatively low speed in a so-called "search" mode. At the same time, the gears are capable of transmitting high torque loads to drive such a torpedo at an extremely high power level with loading being transmitted via the springs and the stops as well as the elastomeric material.

In a preferred embodiment, the springs are in the form of spring fingers and are directed at least somewhat radially.

Preferably, the ring surrounds the hub and the fingers are carried by the ring with the stop means being carried by the hub.

The invention also contemplates that the fingers be in close axial adjacency to at least one side surface of the other component of the gear so as to radially overlap the side surface. As a consequence, the spring fingers may engage such side surface to transmit axial loading between the hub and the ring thereby facilitating the use of helical gear teeth.

In a preferred embodiment, back-up means are provided for the spring fingers for limiting deflection of the same. In a highly preferred embodiment, such back-up means are additional fingers, one for each spring finger and are in backing relation to the corresponding spring finger. This construction serves as a back-up in the event of failure of the elastomer by increasing the torque that may be transmitted to the gear.

The invention also contemplates the provision of a multiple load path transmission including an input shaft and an output shaft along with at least two independent gear trains, each having multiple gears, interconnecting the input shaft and the output shaft. At least one gear in each gear train is a torsionally compliant gear as described previously.

Other objects and advantages will become apparent from the following specification taken in connection with the accompanying drawings.

DESCRIPTION OF THE PREFERRED EMBODIMENT

Figure 1:
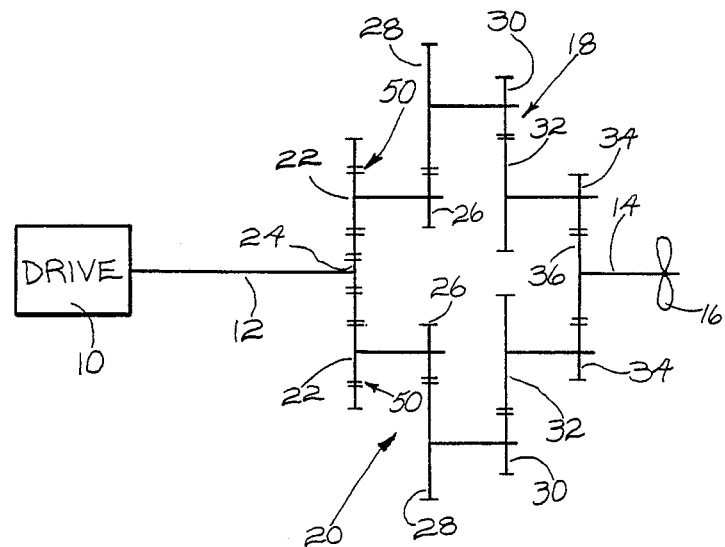
FIG. 1 is a schematic view of a multiple load path transmission made according to the invention.

A multiple load path transmission made according to the invention and utilizing a torsionally compliant gear in each load path, which gear is made accordingly to the invention, is illustrated in FIG. 1 in somewhat schematic form as part of a torpedo drive system. As shown therein, there is provided a drive motor 10 or the like driving an input shaft 12 to the transmission. The transmission also includes an output shaft 14 for driving a propeller 16. The transmission itself includes first and second, multiple gear, independently operable gear trains, generally designated 18 and 20 respectively, interconnecting the input shaft 12 and the output shaft 14. The gear trains 18 and 20 are intended to be identical and each includes a torsionally compliant gear 22, to be described in greater detail hereinafter, in mesh with a gear 24 on the input shaft 12. Each torsionally compliant gear 22 drives a gear 26 which in turn is in mesh with a gear 28. The gears 28 respectively drive gears 30 which are meshed with gears 32 driving gears 34. The gears 34 drive a single gear 36 on the output shaft 14.

Thus, each set of gears 22, 26, 28, 30, 32 and 34 form a separate load path between the input shaft 12 and the output shaft 14.

As noted earlier, imperfections in the manufacturing process such as tolerances would frequently result in one gear train carrying more of a load than the other and such in turn would generate noise creating stresses in the more heavily loaded gear train. The presence of the torsionally compliant gears 22 allow the phasing of one gear train 18 to adjust relative to the other gear train 20, or vice versa, to achieve equal loading and thus minimize the generation of noise by lowering stress levels to an absolute minimum in each gear train as well as allow the size and weight of each gear train to be minimized.

As is well known, torpedoes of modern design may operate in a slow speed, so-called "search mode" during which they are attempting to locate and lock on to their target. When the target is found and locked on, the torpedo goes into a high speed mode to rapidly close upon the target.

To minimize the opportunity for premature detection of the torpedo, it is desirable that the torpedo operate as noiselessly as possible. This is all the more important during the search mode because the duration of such mode will be somewhat indeterminate depending upon the rapidity with which the torpedo locates and locks on its target. At the same time, once the torpedo has locked on the target, noiseless operation becomes of less consequence because of the ability of the torpedo to continue to pursue the target regardless of evasive maneuvers taken.

At the same time, far more power must be transmitted from the driven 10 to the propeller 16 once the torpedo has located its target and goes into a high speed drive mode. At this point, it is highly desirable that there be positive and sure transmission of power. In other words, it is a must that there be no failures within the load paths 18 and 20, and particularly within the torsionally compliant gears 22 which may be the weakest link in each of the load paths 18 and 20.

Figure 2:
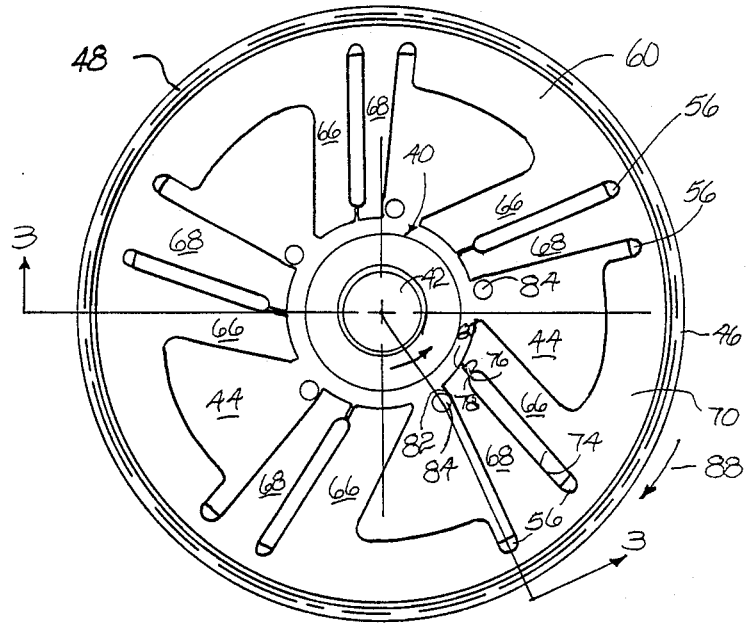
FIG. 2 is a side elevation of a torsionally compliant gear made according to the invention.
Figure 3:
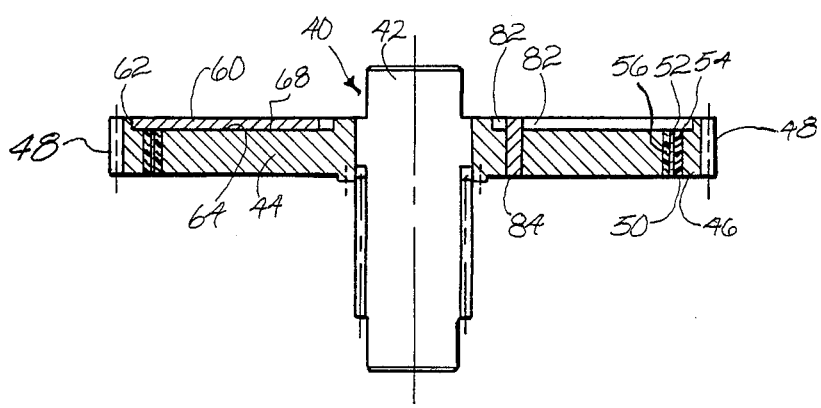
FIG. 3 is a sectional view taken approximately along the line 3—3 in FIG. 2.

To assure that failures will not be encountered, the gears 22 are made as illustrated in FIGS. 2 and 3. With reference thereto, each of the gears 22 includes a hub, generaly designated 40, made up of a shaft 42 and a circular plate 44 splined thereto. Concentric with the hub 40 is a ring 46 having external gear teeth 48 thereon. The ring 46 is spaced from the periphery of the plate 44 forming part of the hub 40 and in the resulting annulus, a circular body, generally designated 50, primarily of elastomeric material is located. The body 50 is formed by a metallic shim 52 sandwiched by two layers 54 and 56 of any suitable elastomer which are in turn bonded respectively to the plate 44 and the inner surface of the ring 46. Thus, the ring 46 may rotate relative to the hub 40 against the resistance of the body 50. This arrangement as thus described is highly preferred in that the elastomeric material 54 and 56 is always placed in shear and never in tension. Those skilled in the art will recognize that this minimizes the possibility of failure of the elastomeric material. The pressure of the shim 52 serves to restrict the amount of compression that may be applied to the elastomeric material but allows a full measure of shear. Further, the spring rate of the elastomer is lower and more uniform in shear to provide greater uniformity in response.

As best seen in FIG. 3, a plate 60 is welded as at 62 to the ring 46 and is in very close axial adjacency to one side 64 of the plate 44 forming part of the hub 40. As best seen in FIG. 2, portions of the plate 60 are cut away to provide five pairs of fingers 66 and 68. The fingers 66 and 68 extend at least somewhat radially inwardly from the periphery 70 of the plate 60 toward the hub 40 and radially overlap the side 64 of the plate 44. Under side loading the fingers 66 and 68 may engage the side 64 allowing axial loading and permitting the use of helical teeth as the teeth 48. If desired, the plate 60 could be secured to the hub 40 with the fingers 66 and 68 configured to extend outwardly in the generally radial direction toward the ring 46.

The fingers 66 and 68 in each pair are separated by a relatively wide slot 74 along most of their lengths. Near their radially inner extremity, the slot 74 narrows down to a fairly narrow slot 76 so that each finger 68 includes a surface 78 in very close proximity to a similar surface 80 on paired finger 66.

Oppositely of the surface 78, each of the fingers 68 includes a surface 82 which is in close adjacency to a corresponding axially directed pin 84 which acts as a stop for purposes to be seen. Each of the pins 84 is carried by the plate 44 forming part of the hub 40. The arrangement is such that a small space exists between each pin 84 on the adjacent surface 82 on the adjacent finger 68 when the body 50 is not in shear.

The fingers 68 serve as spring fingers while the fingers 66 serve as back-up fingers. When the gear is employed in the transmission illustrated in FIG. 1, rotative force from the drive 10 will be applied in the direction of an arrow 88 in FIG. 2 to the ring 46. This loading will cause the ring 46 to move angularly in the same direction relative to the hub 40 but such movement will be resisted by the body 50 of elastomeric material. Some shifting in one of the gear trains of the ring 46 relative to the associated hub 40 will occur to equalize loading and if overall loading on both gears is low, some space between the stop pins 84 and the surfaces 82 will continue to exist. Thus, force transmission will be solely through the body 50 of elastomer and the same will be relatively noiseless. An increase in the force transmitted will increase the magnitude of the relative movement between the hub 40 and the ring 46 possible shift with the consequence that the surfaces 82 will be brought into abutment with the corresponding stop greater amounts of force are being transmitted. At this point in time, high loading, characteristic of a high speed mode of a naval torpedo will be occurring; and the load will be borne both by the spring fingers 68 and the body 50 of elastomeric material.

Should the latter fail for any reason, the release of the load being carried thereby will result in additional relative movement between the ring 46 and the hub 40 causing the surfaces 78 of the spring fingers 68 to abut the surfaces 80 of the fingers 66. The latter act as a back-up preventing any further deflection of the springs 68 so that the full measure of load to be transmitted will be carried by the gears.

Thus it will be appreciated that a torsionally compliant gear made according to the invention is ideally suited for use in multiple load path transmissions. It is particularly well suited for such transmissions as utilized in naval torpedoes because of its ability to transmit adequate torque at low power levels in a relatively noiseless fashion. Furthermore, the provision of the back-up fingers 66 and a fail safe measure to the construction to increase reliability. At the same time, difficulties heretofore found in multiple load transmissions are avoided since the gears' ability to be torsionally compliant compensate for manufacturing errors while the use of the body of elastomer eliminates long shaft lengths heretofore required in systems utilizing torque shafts for equalization purposes.

I claim:

1. A torsionally compliant gear comprising:
   a hub;
   a ring having external gear teeth and concentric about said hub in spaced relation thereto;
   a body of elastomeric material between said hub and said ring and interconnecting the two;
   spring fingers carried by one of said ring and said hub and directed at least somewhat radially toward the other of said ring and said hub; and
   stop means on said other of said ring and said hub and positioned to be normally spaced from said spring fingers when low loads are transmitted by said gear and to engage said spring fingers when predetermined higher loads are to be transmitted by said gear.

2. The torsionally compliant gear of claim 1 wherein said fingers are carried by said ring and said stop means are carried by said hub.

3. The torsionally compliant gear of claim 1 wherein said fingers are in close axial adjacency to at least one side surface of said other of said ring and said hub and radially overlap said side surface so that said spring fingers may engage said side surface to transmit axial loading between said hub and said ring.

4. The torsionally compliant gear of claim 1 further including additional fingers, one for each spring finger, carried by said one of said hub and said ring in backing relation to the corresponding spring finger for limiting deflection of the same when in engagement with said stop means.

5. The torsionally compliant gear of claim 1 further including back-up means for said spring fingers for limiting deflection of the same.

6. A multiple load path transmission comprising:
   an input shaft;
   an output shaft; and
   at least two independent gear trains, each having multiple gears, interconnecting said input shaft and said output shaft; and
   wherein at least one gear in each said train is the torsionally compliant gear of claim 1.

7. A torsionally compliant gear comprising:
   a hub;
   a ring having external gear teeth and concentric about said hub in spaced relation thereto;
   a body of elastomeric material between said hub and said ring and interconnecting the two;
   springs carried by one of said ring and said hub; and
   stop means on said other of said ring and said hub and positioned to be normally spaced from said spring fingers when low loads are transmitted by said gear and to engage said spring fingers when predetermined higher loads are to be transmitted by said gear.

8. A torsionally compliant gear comprising:
   a hub;
   a ring having gear teeth and concentric with said hub in spaced relation thereto;
   a body of elastomeric material between said hub and said ring and interconnecting the two;
   springs carried by one of said ring and said hub; and
   stop means on said other of said ring and said hub and positioned to be normally spaced from said spring fingers when low loads are transmitted by said gear and to engage said spring fingers when predetermined higher loads are to be transmitted by said gear.

* * * * *